United States Patent [19]
Nale

[11] Patent Number: 5,987,581
[45] Date of Patent: Nov. 16, 1999

[54] CONFIGURABLE ADDRESS LINE INVERTER FOR REMAPPING MEMORY

[75] Inventor: William Harry Nale, Livermore, Calif.

[73] Assignee: Intel Corporation, Santa Clara, Calif.

[21] Appl. No.: 08/832,574

[22] Filed: Apr. 2, 1997

[51] Int. Cl.[6] .................................................. G06F 12/02
[52] U.S. Cl. .......................................... 711/202; 395/652
[58] Field of Search ................................. 395/652, 653, 395/651; 364/280.2, 280.9; 711/103, 202

[56] References Cited

U.S. PATENT DOCUMENTS

| | | | |
|---|---|---|---|
| 3,581,291 | 5/1971 | Iwamoto et al. | 340/172.5 |
| 3,753,232 | 8/1973 | Sporer | 340/172.5 |
| 3,796,996 | 3/1974 | Curley et al. | 340/172.5 |
| 3,806,881 | 4/1974 | Miwa et al. | 340/172.5 |
| 3,970,999 | 7/1976 | Elward | 340/172.5 |
| 3,974,479 | 8/1976 | Kotok et al. | 340/172.5 |
| 3,984,812 | 10/1976 | Dahlberg et al. | 340/172.5 |
| 4,016,545 | 4/1977 | Lipovski | 340/172.5 |
| 4,056,845 | 11/1977 | Churchill, Jr. | 364/200 |
| 4,399,435 | 8/1983 | Urabe | 340/750 |
| 4,403,283 | 9/1983 | Myntti et al. | 364/200 |
| 4,442,487 | 4/1984 | Fletcher et al. | 364/200 |
| 4,445,191 | 4/1984 | York | 364/900 |
| 4,495,565 | 1/1985 | Thompson | 364/200 |
| 4,680,700 | 7/1987 | Hester et al. | 364/200 |
| 4,774,652 | 9/1988 | Dhuey et al. | 364/200 |
| 4,899,272 | 2/1990 | Fung et al. | 365/230.03 |
| 4,905,141 | 2/1990 | Brenza | 364/200 |
| 4,985,871 | 1/1991 | Catlin | 365/230.06 |
| 5,237,669 | 8/1993 | Spear et al. | 395/400 |
| 5,313,606 | 5/1994 | Luong et al. | 395/425 |
| 5,367,658 | 11/1994 | Spear et al. | 395/425 |
| 5,371,876 | 12/1994 | Ewertz et al. | 395/425 |
| 5,473,775 | 12/1995 | Sakai et al. | 395/700 |
| 5,479,639 | 12/1995 | Ewertz et al. | 395/430 |
| 5,522,076 | 5/1996 | Dewa et al. | 395/700 |
| 5,568,641 | 10/1996 | Nelson et al. | 395/700 |
| 5,687,342 | 11/1997 | Kass | 395/411 |
| 5,751,998 | 5/1998 | Wunderlich et al. | 395/490 |
| 5,889,987 | 3/1999 | Nelson et al. | 395/652 |

*Primary Examiner*—Eddie P. Chan
*Assistant Examiner*—Kevin Verbrugge
*Attorney, Agent, or Firm*—Sierra Patent Group, Ltd.

[57] ABSTRACT

A flexible memory mapper for selectively inverting the state of an address line on an address bus includes a selectable inverter element and a control circuit. The selectable inverter element has a control input coupled to an output of the control circuit, an input, and an output. The control input, the input, and the output are capable of being in two logic levels. When the control input is in a first logic level, the input is passed through uninverted to the output of the selectable inverter element. When the control input is in a second logic level, the input is passed through inverted to the output of the selectable inverter element. The control circuit output feeds one of two logic levels to the control input of the selectable inverter element, outputting the second logic level in response to an input address within a selected address range and a user selectable input bit, and otherwise outputting the first logic level.

54 Claims, 1 Drawing Sheet

FIG. 1

CONFIGURABLE ADDRESS LINE INVERTER FOR REMAPPING MEMORY

BACKGROUND OF THE INVENTION

1. Field of the Invention

The present invention relates to the mapping of a first memory address into a second memory address. More particularly, the present invention relates to the mapping of a large BIOS into any system ROM address space, the accessing of an entire flash ROM from a 32K window of the system ROM, and in the case of flash ROMs, the switching of a boot block code section with a BIOS code section in the system ROM address space.

2. The Prior Art

A computer system includes a ROM which is used to hold initial startup code and the System BIOS ROM. The computer may also contain other ROMs on add in cards. When additional ROM add in cards are built onto the system board, they are often combined with the system ROM, since one larger ROM is cheaper to produce than several smaller ones.

ROMS require 16 to 19 address lines, depending upon their size. The CPU memory map is shown in Table 1 as follows:

TABLE 1

| CPU Memory: | Size | Function |
| --- | --- | --- |
| 100000 & above | | Main memory |
| F0000-FFFFF | 64K | System ROM |
| E0000-EFFFF | 64K | System ROM extension |
| D0000-DFFFF | 64K | Miscellaneous |
| CC000-CFFFF | 16K | Other ROMS |
| C8000-CBFFF | 16K | Disk |
| C0000-C7FFF | 32K | Graphics ROM |
| A0000-BFFFF | | Video |
| 00000-9FFFF | | Main Memory |

The available address space for the ROMS is a 256K address space from C0000–1M. The memory space F0000–FFFFF is allocated to System ROM. Although the 64K space E0000–EFFFF is allocated as a System ROM extension, the space may be used for other purposes if not used.

The memory spaces above 1M and below C0000 are not available for the ROMs. The memory space above 1M is inaccessible in some modes. The 64K space C0000–CFFFF is preferably left unused in order to allow customers to use this space for programming purposes. From 0 to A is system memory, which is never on the ISA bus.

BIOS

The BIOS serves many functions, both at start-up and after the operating system has taken control of the microprocessor. The BIOS is used for system configuration and IO related functions. An important function of the system BIOS is that it can map in the setup screen, PCI plug and play code, plug and play storage areas, etc.

The prior art merely imposes limitations on where each block can be mapped, limited to the granularity of the size of the block being mapped. To prevent two blocks from accessing the same location in the system memory, a need exists in the prior art for a more versatile means of mapping into the system ROM. Furthermore, a need exists in the prior art for a method of mapping into the system ROM while maintaining a 32K byte granularity.

As the BIOSes provide more functionality, the normal 64K space allocated in ROM is not sufficient. Although expansion is possible, 128K is the limit. A need exists in the prior art for a mapping method which would allow paging of a large BIOS into any ROM address space.

Flash ROM reprogramming

Flash ROMs are a non-volatile form of storage which have recently been used for embedded code storage (e.g., BIOS code). Most importantly, they provide the user with an easy, low-cost method of reprogramming the BIOS and storing system configuration information after the system is in the user's hands.

Windows 95 provides only a 64K byte memory space when it requests that plug-and-play information be written to non-volatile storage. Both the program to perform the reprogramming and the flash ROM to be programmed must reside in this area. Ideally, 32K of this space is allocated to the flash ROM area and 32K is allocated to the code. The code must move itself between the two halves, being able to program a maximum of a 64K byte memory space. A need exists for a means for accessing the entire flash ROM from a 32K window.

"Boot Block": Address Switching

Reprogramming a flash ROM requires that it be completely erased before reprogramming. If reprogramming is interrupted, such as by a power loss, the flash ROM could be left in an erased or partially erased state. If this occurs, the computer will no longer operate after the power is restored because the initial startup code has been erased or corrupted. This problem was solved by a "boot block" function.

The "boot block" function includes a small section of the flash ROM which is unalterable once programmed by the manufacturer. This "boot block code" contains a startup program which checks the integrity of the remainder of the ROM, then reprograms the corrupted portion of the ROM from a disk.

The boot block area is initially located where the CPU begins executing code, at the highest location of the ROM. Once the integrity test is complete, a typical system remaps the ROM by inverting the highest address bit to the ROM, since it is considered undesireable for the integrity test code to be taking up this prime location in the memory map. Since the "boot block" code resides in the ROM where the system BIOS is generally found, the BIOS replaces the boot block code via an "Address Line Inversion".

The "Address Line Inversion" is performed by inverting the highest address bit (MSB) to the ROM, switching the upper and lower halves. The address bit that must be flipped is different for different size ROMs. For 1 Mbit ROMs A16 is flipped, 2 Mbit ROMs A17 is flipped, and 4 Mbit ROMs A18 is flipped. According to the prior art, the control functions are built into the core logic, and are specific to a particular size ROM. A need exists in the prior art for a versatile method of selectively inverting the highest address line from the processor which is used by the ROM (e.g., flash ROM).

BRIEF DESCRIPTION OF THE INVENTION

The present invention includes an apparatus for selectively inverting the state of an address line on an address bus, including a selectable inverter element and a control circuit. The control circuit provides system flexibility, since an address line specified by the control circuit may be inverted by the selectable inverter element, depending upon an input address within a selected address range and a user selectable input bit.

According to a first aspect of the present invention, the selectable inverter element includes a control input coupled to an output of a control circuit, an input, and an output coupled to one of the address lines on the address bus. The control input, the input, and the output are capable of being in two logic levels. When the control input is in a first logic level, the input is passed through to the output. When the control input is in a second logic level, the input is inverted at the output of the selectable inverter element.

According to a second aspect of the present invention, the control circuit includes an output coupled to the selectable inverter element control input. The control circuit places either the first or the second logic level at its output in response to the input address and the user selectable input bit. In this manner, the control circuit controls the conditions in which an address line may be inverted by a selectable inverter element. The various conditions in which one or more address lines may be inverted can be stored in separate memory locations (e.g., registers).

With the recent and rapid increase in functionality of BIOSes and corresponding increase in system ROM capacity, it has become necessary to map sections of a larger ROM area within a system ROM area. Prior ROM mapping techniques require hardwiring a mapping mechanism for a specific ROM size. The present invention provides a method of mapping an address to the ROM system space, regardless of the size ROM used.

The present invention is particularly useful for paging a large BIOS ROM into any of the ROM address space. Similarly, where a flash ROM is used, the present invention allows the entire flash ROM to be reprogrammed through one 32K window of the ROM system space by allocating 32K for the code and rolling the flash ROM through the other 32K area. In addition, in the area of flash ROMs, the highest address line from the processor which is used by the ROM (e.g., flash ROM) can be inverted to switch a boot block code section with a BIOS code section, regardless of the size ROM used. Alternatively, the memory mapper has applications in the area of mapping addresses and memory locations other than ROM.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

According to a preferred embodiment of the present invention, it is possible to map any segment of a ROM into a contiguous area within the 256K ROM system address space C0000–LM while maintaining a 32K byte granularity within the ROM system address space. The present invention is particularly useful for paging a large BIOS ROM into any of the ROM address space. Another useful application of the present invention is in the use of flash ROMs. Where a flash ROM is used, the present invention allows the entire flash ROM to be reprogrammed through one 32K window of system ROM by allocating 32K for the code and rolling the flash ROM through the other 32K area. In addition, the highest address line from the processor which is used by the flash ROM can be inverted to switch the two halves containing a BIOS code section and a boot block code section, regardless of the size ROM used. Although the primary applications of the memory mapper are in the area of ROM mapping, those of ordinary skill in the art will appreciate that alternative applications in the area of mapping addresses and memory locations in general are possible.

Figure 1:
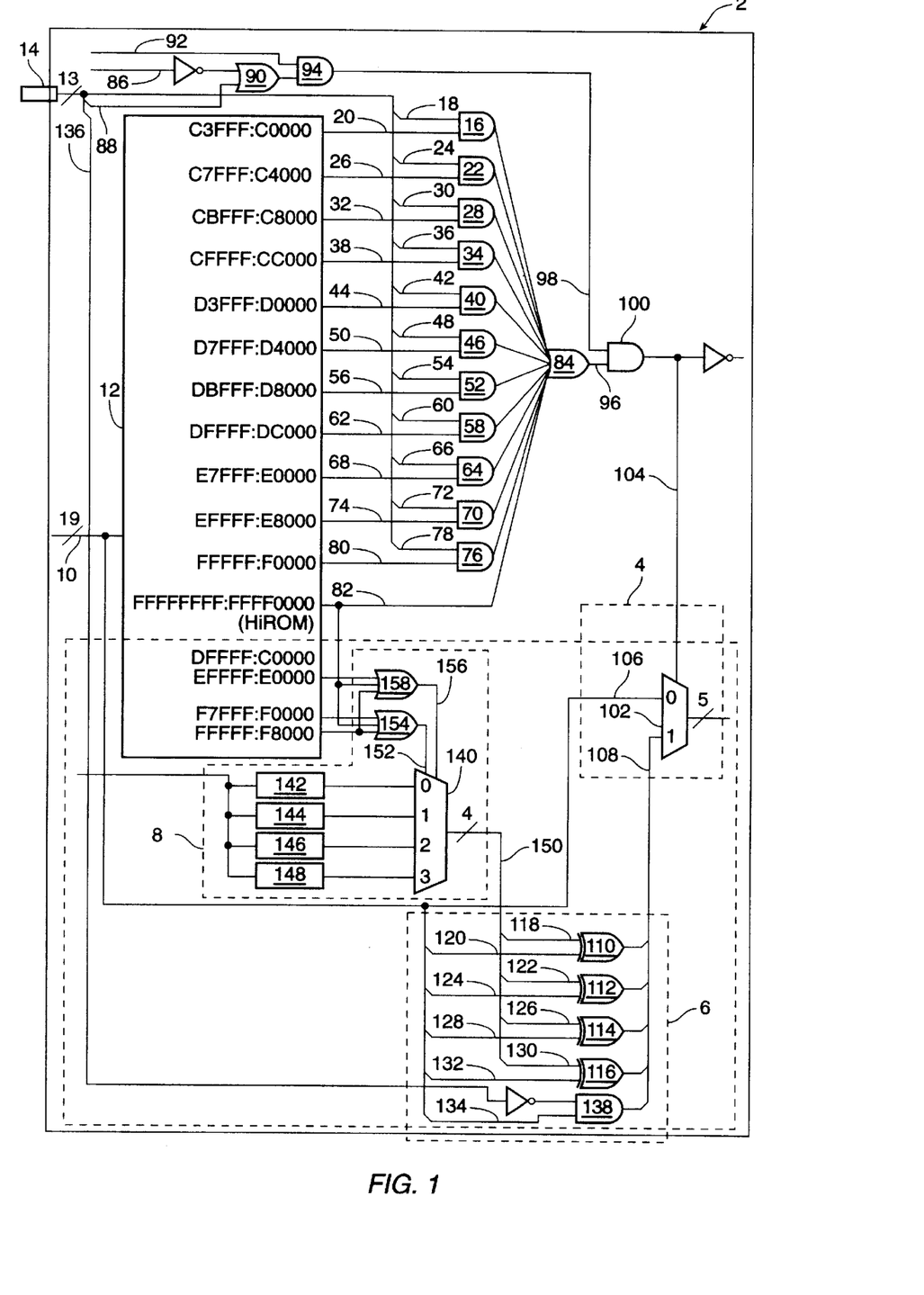
FIG. 1 is a schematic diagram of a flexible memory mapper according to the presently preferred embodiment of the present invention.

Referring to FIG. 1, a flexible memory mapper 2 is shown. Since more than one device has access to the ISA bus, it is necessary to prevent devices other than the ROM from accidentally accessing the bus during the mapping of the ROM. Thus, the memory mapper 2 is in a mapping state only when an input address is in an active ROM area and when the ROM access is valid. An address selector 4 of the present invention selects a mapped address as an output of the memory mapper 2 when the memory mapper 2 is in a mapping state, and selects the input address as the output when the memory mapper 2 is not in a mapping state. The mapped address is created by a plurality of selectable inverter elements 6, each of which allows an address line input to either be passed through or inverted. A control circuit 8 controls the conditions in which each of the selectable inverter elements 6 inverts the corresponding address line input.

First, the address to be mapped is loaded from a multibit address bus 10 into an address decoder 12. According to a presently preferred embodiment of the present invention, the address is 19 bits wide corresponding to 19 address lines. However, those of ordinary skill in the art will appreciate that a different number of address lines are possible. In the illustrative embodiment of FIG. 1, the address decoder 12 comprises 16 bits, one bit corresponding to each of a plurality of memory blocks: C0000–C3FFF, C4000–C7FFF, C8000–CBFFF, CC000–CFFFF, D0000–D3FFF, D4000–D7FFF, D8000–DBFFF, DC000–DFFFF, E0000–E7FFF, E8000–EFFFF, F0000–FFFFF, FFFF0000–FFFFF, C0000–DFFFF, E0000–EFFFF, F0000–F7FFF, or F8000–FFFFF. The address decoder 12 sets the output bit corresponding to the address range containing the incoming address. For example, if the incoming address is C9OFE, the bit corresponding to the address range C8000–CBFFF is set.

According to a presently preferred embodiment of the present invention, the memory mapper 2 determines whether any of the system ROM areas are being accessed. First, a 13 bit configuration register 14 which defines the memory areas that access the system ROM is loaded from the system setup. The first 11 bits of this configuration register 14 are then compared with the address decoder 12 bits corresponding to memory areas C3FFF–C0000, C7FFF–C4000, CBFFF–C8000, CFFFF–CC000, D3FFF–D0000, D7FFF–D4000, DBFFF–D8000, DFFFF–DC000, E7FFF–E0000, EFFFF–E8000, and FFFFF–F0000 to determine if any of the system ROM areas are being accessed. This operation is performed by a plurality of AND gates, each AND gate determining whether a particular area is both being accessed and an active ROM area. The outputs of the AND gates are connected to an OR gate, the resulting output determining whether there has been any access to a ROM area.

Specifically, a first AND gate 16 has two inputs, the first input 18 connected to the first bit of the configuration register 14 and the second input 20 connected to the address decoder bit corresponding to memory block C0000–C3FFF. A second AND gate 22 has two inputs, the first input 24 connected to the second bit of the configuration register and the second input 26 connected to the address decoder bit corresponding to memory block C4000–C7FFF. A third AND gate 28 has two inputs, the first input 30 connected to the third bit of the configuration register and the second input 32 connected to the address decoder bit corresponding to memory block C8000–CBFFF. A fourth AND gate 34 has two inputs, the first input 36 connected to the fourth bit of the configuration register and the second input 38 connected to the address decoder bit corresponding to memory block CC000–CFFFF. A fifth AND gate 40 has two inputs, the first input 42 connected to the fifth bit of the configuration register and the second input 44 connected to the address decoder bit corresponding to memory block D0000–D3FFF. A sixth AND gate 46 has two inputs, the first input 48 connected to the sixth bit of the configuration register and the second input 50 connected to the address decoder bit corresponding to memory block D4000–D7FFF. A seventh AND gate 52 has two inputs, the first input 54 connected to the seventh bit of the configuration register and the second input 56 connected to the address decoder bit corresponding to memory block D8000–DBFFF. An eighth AND gate 58 has two inputs, the first input 60 connected to the eighth bit of the configuration register and the second input 62 connected to the address decoder bit corresponding to memory block DC000–DFFFF. A ninth AND gate 64 has two inputs, the first input 66 connected to the ninth bit of the configuration register and the second input 68 connected to the address decoder bit corresponding to memory block E0000–E7FFF. A tenth AND gate 70 has two inputs, the first input 72 connected to the tenth bit of the configuration register and the second input 74 connected to the address decoder bit corresponding to memory block E8000–EFFFF. An eleventh AND gate 76 has two inputs, the first input 78 connected to 10 the eleventh bit of the configuration register and the second input 80 connected to the address decoder bit corresponding to memory block F0000–FFFFF. The outputs of AND gates 16, 22, 28, 34, 40, 46, 52, 58, 64, 70, 76 and the address decoder bit corresponding to the HiROM memory block FFFFFFFF–FFFF0000 82 are inputs to an OR gate 84. Thus, the output of OR gate 84 is positive when an active ROM area is accessed.

Next, the memory mapper 2 determines whether the ROM access is a valid ROM access. There must be a memory cycle rather than an 10 cycle for there to be a valid ROM access. In addition, if there is a read cycle, or if there is a write cycle and the write select indicates that data can be written to the ROM location, the ROM access is valid. Although the logic circuit is configured in the following manner, those of ordinary skill in the art will appreciate that alternative configurations are possible. In the presently preferred embodiment of the present invention, an inverted read/write signal 86 and a write select signal 88, bit 12 of the configuration register 14, are inputs to an OR gate 90. The output of the OR gate 90 and a memory/IO signal 92 are inputs to an AND gate 94, the output of the AND gate 94 determining whether there is a valid ROM access. The memory/IO signal 92 is high during a memory cycle. The read/write signal 86 is low during a read cycle and high during a write cycle. The write select 88 is high when data can be written to the ROM. Thus, if there is a system ROM access 96 and this is a valid ROM access 98, the output of AND gate 100 is a 1.

According to a first aspect of the present invention, an address selecting means determines whether the original address or the mapped address is an output of the memory mapper. Essentially, this address selecting means provides a means for bypassing the memory mapper 2. When there is a valid ROM access, a "non-bypass" address range is accessed, and the address selecting means selects the mapped address as the output. However, if there has not been a ROM access or the ROM access is not valid, an address outside of the "non-bypass" address range is accessed, and the original address is selected as the output, since it may be used by other devices on the ISA bus which share the same address bus.

As embodied herein, the address selecting means comprises the address selector 4 configured with a multibit wide 2-to-1 multiplexer 102 having one multiplexer select line 104. The first input 106 to the multiplexer 102 is the original address and the second input 108 to the multiplexer 102 is the mapped address. When the output of AND gate 100 is high, as described above, the multiplexer select line 104 is high, choosing the mapped address. If the multiplexer select line 104 is low, the multiplexer 102 ignores the mapped address and takes the original address and passes it on through unmodified. According to the presently preferred embodiment of the present invention, the output of this multiplexer comprises the uppermost 5 bits of the mapped address. Although the multiplexer 102 does not always select the modified mapped address, the address line coupled to the output of the multiplexer 102 will hereinafter be referred to as a modified address bus.

According to a second aspect of the present invention, the flexible memory mapper 2 of the present invention includes an inverting means for inverting one or more address lines. As embodied herein, the inverting means comprises selectable inverter elements 6, each having an input coupled to an address line, an output coupled to an address line and a control input. The control input determines whether a logic level at the input is inverted at the output or passed through uninverted at the output. The selectable inverter element can be configured in many ways, such as through the use of an exclusive OR gate (XOR). For example, an XOR gate inverts a second input when a first input is a 1, and passes through a second input uninverted when a first input is a 0.

According to the presently preferred embodiment of the present invention, each of four XOR gates 110, 112, 114, 116 function as a potential inverter. A first input 118 to exclusive OR gate 110 is information necessary to invert address line A15 and a second input 120 to exclusive OR gate 110 is address line A15. A first input 122 to exclusive OR gate 112 is information necessary to invert address line A16 and a second input 124 to exclusive OR gate 112 is address line A16. A first input 126 to exclusive OR gate 114 is information necessary to invert address line A17 and a second input 128 to exclusive OR gate 114 is address line A17. A first input 130 to exclusive OR gate 116 is information necessary to invert address line A18 and a second input 132 to exclusive OR gate 116 is address line A18. For each of the exclusive OR gates 110, 112, 114, 116 if the first input is 1, the second input is inverted. If the first input is 0, the second input is passed through uninverted. In this manner, address lines A15–A18 are selectively inverted independently of each other. Thus, the outputs of XOR gates 110, 112, 114, 116 comprise bits A15–A18 of the mapped address, and are connected to the second input 108 of the final multiplexer 102.

According to the present invention, a ROM and various devices are connected to a standard bus (ISA). Therefore, it is important to ensure that once a mapped address is put on the ISA bus that another device on the ISA bus is not accidentally accessed. For example, if a mapped address corresponding to a large ROM is put on the ISA bus, another device (e.g., VGA) might respond to it.

To solve the accidental-access problem, the flexible memory mapper 2 of the present invention includes a translating means for preventing a device other than ROM from being accessed by the mapped address. Those of ordinary skill in the art will appreciate that generally, higher-order address bits are used to select a particular module on the address bus, and lower-order address bits select a memory location or I/O port within the module. Thus, as embodied herein, the translating means comprises an address line A19 134; any time there is a ROM cycle, the address line A19 134 is forced to a zero. To achieve this, address line A19 134 and an inverted enabling configuration bit 136, bit 13 of the configuration register 14, are inputs to an AND gate 138. If the enabling configuration bit 136 is 0, the output of the inverter will be a 1, allowing the address line A19 134 to pass through. If the enabling configuration bit 136 is high, the address line A19 134 is blocked. During a ROM access, when A19 134 is 0, the address on the ISA bus will appear to other devices to be in the "main memory" section. This "main memory" area is never on the ISA bus, so a device cannot accidentally respond.

According to a third aspect of the present invention, the flexible memory mapper 2 of the present invention includes an inversion selecting means for determining the conditions in which one or more address lines may be inverted. As embodied herein, the inversion selecting means comprises a control circuit 8, the output of the circuit coupled to the control input of the selectable inverter element. The control circuit can be implemented in many ways. For example, a 4-to-1 multiplexer 140 may be used to select one of four registers 142, 144, 146, 148 as the multiplexer output 150. A first select line 152 is fed by a first OR gate 154 and a second select line 156 is fed by a second OR gate 158.

According to the presently preferred embodiment of the present invention, there are 4 windows, as shown below in Table 2. Memory range F0000–FFFFF is always used by the BIOS ROM, so it is useful to divide this area into two windows. However, memory range E0000–EFFFF, used as a system ROM extension, does not require a 32K byte granularity. Similarly, memory range C0000–DFFFF is lightly used and requires only one 128K window. Four separate memory locations are used in order to keep these window areas distinct. As embodied herein, each of the memory locations comprises a four bit register. Although no more than four windows are necessary, persons of ordinary skill in the art will readily appreciate that a greater or fewer number of windows may be used. In the presently preferred embodiment, 4 windows are implemented, since having greater than 4 windows increases the number of address bits required. Using an exclusive OR function rather than using the register bits directly as an address allows the window sizes to be different while maintaining a 32K byte granularity and having the entire ROM accessible through any 32K area of the 256K address space for reprogramming or accessing.

TABLE 2

| Window | Window Size |
| --- | --- |
| C0000-DFFFF | 128K |
| E0000-EFFFF | 64K |
| F0000-F7FFF | 32K |
| F8000-FFFFF | 32K |

The four registers 142, 144, 146, 148 contain bit inversion information for each of the 4 areas of the CPU address space which are allocated to the ROM shown in Table 2. Each of the registers 142, 144, 146, 148 contain 4 bits, corresponding to address lines A15–18. The contents of each of the registers 142, 144, 146, 148 is determined by software which calculates the bit(s) to flip to make the address equal the ROM address; the corresponding register bits are then set to 1 in all four of the registers while the remaining bits are set to 0. Alternatively, the software can be configured to map the address to a location other than ROM.

TABLE 3

| S1 = Output$_{OR1}$ | S2 = Output$_{OR2}$ | Output |
| --- | --- | --- |
| 0 | 0 | R1 [3:0] |
| 0 | 1 | R2 [7:4] |
| 1 | 0 | R3 [11:8] |
| 1 | 1 | R4 [15:12] | the 4-to-1 multiplexer 140 selects one of the four registers 142, 144, 146, 148 to supply the bit inversion information to the XOR gates 110, 112, 114, 116 depending upon the outputs of the two OR gates 154, 158 as shown above in Table 3. The multiplexer has four input lines, fed by the four registers 142, 144, 146, 148 and two select lines, the first select line S1 152 being the output from the first OR gate 154 and the second select line S2 156 being the output from the second OR gate 158. The output of the first OR gate 154 is dependent upon the CPU address, as shown in Table 4. Similarly, the output of the second OR gate 158 is dependent upon the CPU address, as shown in Table 5. Therefore, which one of the four 4 bit registers 142, 144, 146, 148 is selected and used to feed the four exclusive OR gates 110, 112, 114, 116 is determined by the address from the CPU.

TABLE 4

| FFFFFFFF-FFFF0000 | FFFFF-F8000 | F7FFF-F0000 | Output OR-1 |
| --- | --- | --- | --- |
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

TABLE 5

| FFFFFFFF-FFFF0000 | FFFFF-F8000 | EFFFF-E0000 | Output OR-2 |
| --- | --- | --- | --- |
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

For example, when one of the memory blocks FFFFFFFF–FFFF0000, FFFFF–F8000, or F7FFF–F0000 is activated, the output of the first OR gate 154, and the first select line 152 to the multiplexer 140 is 1. If the output of the second OR gate 158 is 0, the second select line 156 to the multiplexer 140 is also 0, selecting register 2, or 10 in binary notation. However, if the output of the second OR gate 158 is 1, the select lines 152, 156 to the multiplexer 140 select register 3, or 11 in binary notation.

In summary, the one or more selectable inverter elements 6 invert one or more input address lines depending upon the conditions provided by the control circuit 8, creating the mapped address. Next, the address selector 4 selects either the original input address or the mapped address as the output of the flexible memory mapper 2. Thus, the present invention provides a flexible means for mapping memory addresses in a variety of circumstances. The present invention has particular utility, however, in the areas of mapping a BIOS ROM or flash ROM into a system ROM area and supplying a flexible "Address Line Inversion" function for use with "boot block flash ROMs."

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a computer system having an address bus including a plurality of address lines, apparatus for selectively inverting the state of one of the address lines, comprising:

a selectable inverter element having an input coupled to the address line to be selectably inverted, an output, and a control input, said control input when at a first logic level causing said selectable inverter element to pass a signal at its input uninverted to its output and when at a second logic level causing said selectable inverter element to pass a signal at its input inverted to its output; and a control circuit having an output coupled to said control input of said selectable inverter element, said control circuit ouputting said second logic level in response to an input address within a selected address range and a user selectable input bit having a predefined logic level, said control circuit otherwise outputting said first logic level.

2. The apparatus according to claim 1 further comprising a plurality of sources each containing a selectable output bit, and means for selecting one of said plurality of sources, the output of each of said sources coupled to the input of said means for selecting, the output of said means for selecting being coupled to said control circuit user selectable input bit.

3. The apparatus according to claim 2, wherein said means for selecting chooses said one of a plurality of sources according to said selected address range of said input address.

4. The apparatus according to claim 3, wherein each of said plurality of sources comprises a different one-bit memory location.

5. The apparatus according to claim 4, said memory location comprising a register.

6. The apparatus according to claim 4, said control circuit further comprising a multiplexer having a first data input coupled to a first source from said plurality of sources, a second data input coupled to a second source from said plurality of sources, a select line coupled to said selected address range, and an output coupled to said selectable inverter element control input.

7. The apparatus according to claim 4, said control circuit further comprising a multiplexer having a first data input coupled to a first source from said plurality of sources, a second data input coupled to a second source from said plurality of sources, a third data input coupled to a third source from said plurality of sources, a fourth data input coupled to a fourth source from said plurality of sources, a select line coupled to said selected address range, and an output coupled to said selectable inverter element control input.

8. The apparatus according to claim 1, further comprising:

means for selectively bypassing said selectable inverter element, said means enabled in response to addresses outside of a non-bypass address range, and said means disabled in response to addresses within said non-bypass address range.

9. The apparatus according to claim 8, said means for selectively bypassing comprising a multiplexer having a first input, a second input, a select line, and an output, said first input being coupled to said selectable inverter element input, said second input being coupled to said selectable inverter element output, said multiplexer select line selecting said second input when said input address is within said non-bypass address range, and otherwise selecting said first input, said multiplexer output being coupled to a modified address bus.

10. The apparatus according to claim 8 further comprising a translating means for preventing a device having an address within said non-bypass address range from being accessed by said selectable inverter element output, wherein said translating means forces a blocking address line other than the address line to be selectively inverted to a preselected state in response to a preselected condition.

11. The apparatus according to claim 10, wherein the plurality of address lines comprises address lines A0–A19, wherein the address line to be selectively inverted is one of address lines A15–A18, and wherein said blocking address line is an address line other than said address lines A15–A18.

12. The apparatus according to claim 11, wherein said preselected condition is an enabling configuration bit having a predefined logic level.

13. The apparatus according to claim 8, said non-bypass address range being ROM.

14. The apparatus according to claim 1, further comprising a translating means for preventing a device from being accessed by said selectable inverter element output, by translating said selectable inverter element output to an address not corresponding to an address of said device.

15. In a computer system having an address bus including a plurality of address lines, apparatus for selectively inverting the states of a plurality of the address lines, comprising:

a plurality of selectable inverter elements, each of said plurality of selectable inverter elements having an input, an output, and a control input, each of said inputs being coupled to a different one of the plurality of address lines to be selectively inverted, each of said control inputs when at a first logic level causing a corresponding one of said plurality of selectable inverter elements to pass a signal at its input uninverted to its output and when at a second logic level causing said corresponding one of said plurality of selectable inverter elements to pass a signal at its input inverted to its output; and a control circuit having a plurality of outputs and a plurality of user selectable input bits, each of said plurality of outputs being coupled to a different control input corresponding to one of said plurality of selectable inverter elements, each of said plurality of user selectable input bits feeding a different one of said outputs and corresponding to a different one of the plurality of address lines, said control circuit placing said second logic level at each of said plurality of outputs in response to an input address within a selected address range when a corresponding one of said plurality of user selectable input bits has a predefined logic level, said control circuit placing said first logic level at the remainder of said outputs.

11

16. The apparatus according to claim 15, further comprising a plurality of sources each containing a plurality of user selectable input bits, and means for selecting one of said plurality of sources.

17. The apparatus according to claim 16, wherein said means for selecting chooses said one of a plurality of sources according to said selected address range of said input address.

18. The apparatus according to claim 17, wherein each of said plurality of sources comprises a different memory location having a number of bits equal to the number of invertable address lines, each of the plurality of address lines to be selectively inverted corresponding to a different one of said bits.

19. The apparatus according to claim 18, said memory location comprising a register.

20. The apparatus according to claim 18, said control circuit further comprising a multiplexer having a first data input coupled to a first source from said plurality of sources, a second data input coupled to a second source from said plurality of sources, a select line coupled to said selected address range, and an output coupled to said control inputs of said plurality of selectable inverter elements.

21. The apparatus according to claim 18, said control circuit further comprising a multiplexer having a first data input coupled to a first source from said plurality of sources, a second data input coupled to a second source from said plurality of sources, a third data input coupled to a third source from said plurality of sources, a fourth data input coupled to a fourth source from said plurality of sources, a select line coupled to said selected address range, and an output coupled to said control inputs of said plurality of selectable inverter elements.

22. The apparatus according to claim 15, further comprising:

means for selectively bypassing said plurality of selectable inverter elements, said means enabled in response to addresses outside of a non-bypass address range, and said means disabled in response to addresses within said non-bypass address range.

23. The apparatus according to claim 22, said means for selectively bypassing comprising a multiplexer having a first input, a second input, a select line, and an output, said first input being coupled to said plurality of selectable inverter element inputs, said second input being coupled to said plurality of selectable inverter element outputs, said multiplexer select line selecting said second input when said input address is within said non-bypass address range, and otherwise selecting said first input, said multiplexer output being coupled to a modified address bus.

24. The apparatus according to claim 22 further comprising a translating means for preventing a device having an address within said non-bypass address range from being accessed by said outputs of said plurality of selectable inverter elements, wherein said translating means forces a blocking address line other than the address lines to be selectively inverted to a preselected state in response to a preselected condition.

25. The apparatus according to claim 24, wherein the plurality of address lines comprises address lines A0–A19, wherein the address lines to be selectively inverted are A15–A18, and wherein said blocking address line is an address line other than said address lines A15–A18.

26. The apparatus according to claim 25, wherein said preselected condition is an enabling configuration bit having a predefined logic level.

27. The apparatus according to claim 22, said non-bypass address range being ROM.

12

28. The apparatus according to claim 15, further comprising a translating means for preventing a device from being accessed by said outputs of said plurality of selectable inverter elements by translating said outputs of said plurality of selectable inverter elements to an address not corresponding to an address of said device.

29. In a computer system having an address bus including a plurality of address lines, apparatus for selectively inverting the states of four of the address lines, comprising:

four selectable inverter elements, each of said four selectable inverter elements having an input, an output, and a control input, each of said inputs being coupled to a different one of the four address lines to be selectively inverted, each of said control inputs when at a first logic level causing a corresponding one of said four selectable inverter elements to pass a signal at its input uninverted to its output and when at a second logic level causing said corresponding one of said four selectable inverter elements to pass a signal at its input inverted to its output; and a control circuit having four outputs and four user selectable input bits, each of said outputs being coupled to a different control input corresponding to one of said selectable inverter elements, each of said user selectable input bits feeding a different one of said outputs and corresponding to a different one of the four address lines, said control circuit placing said second logic level at each of said outputs in response to an input address within a selected address range when a corresponding one of said user selectable input bits has a predefined logic level, said control circuit placing said first logic level at the remainder of said outputs.

30. The apparatus according to claim 29, further comprising a plurality of sources each containing four user selectable bits, and means for selecting one of said plurality of sources.

31. The apparatus according to claim 30, wherein said means for selecting chooses said one of a plurality of sources according to said selected address range of said input address.

32. The apparatus according to claim 31, wherein each of said plurality of sources comprises a different memory location having four bits corresponding to the four address lines to be selectively inverted.

33. The apparatus according to claim 32, said memory location comprising a register.

34. The apparatus according to claim 32, said control circuit further comprising a multiplexer having a first data input coupled to a first source from said plurality of sources, a second data input coupled to a second source from said plurality of sources, a select line coupled to said selected address range, and an output coupled to said control inputs of said four selectable inverter elements.

35. The apparatus according to claim 32, said control circuit further comprising a multiplexer having a first data input coupled to a first source from said plurality of sources, a second data input coupled to a second source from said plurality of sources, a third data input coupled to a third source from said plurality of sources, fourth data input coupled to a fourth source from said plurality of sources, a select line coupled to said selected address range, and an output coupled to said control inputs of said four selectable inverter elements.

36. The apparatus according to claim 29, further comprising:

means for selectively bypassing said four selectable inverter elements, said means enabled in response to addresses outside of a non-bypass address range, and said means disabled in response to addresses within said non-bypass address range.

37. The apparatus according to claim 36, said means for selectively bypassing comprising a multiplexer having a first input, a second input, a select line, and an output, said first input being coupled to said four selectable inverter element inputs, said second input being coupled to said four selectable inverter element outputs, said multiplexer select line selecting said second input when said input address is within said non-bypass address range, and otherwise selecting said first input, said multiplexer output being coupled to a modified address bus.

38. The apparatus according to claim 36 further comprising a translating means for preventing a device having an address within said non-bypass address range from being accessed by said outputs of said four selectable inverter elements, wherein said translating means forces a blocking address line other than the address lines to be selectively inverted to a preselected state in response to a preselected condition.

39. The apparatus according to claim 38, wherein the plurality of address lines comprises address lines A0–A19, wherein the address lines to be selectively inverted are address lines A15–A18, and wherein said blocking address line is an address line other than said address lines A15–A18.

40. The apparatus according to claim 39, wherein said preselected condition is an enabling configuration bit having a predefined logic level.

41. The apparatus according to claim 36, said non-bypass address range being ROM.

42. The apparatus according to claim 41, said first source corresponding to a first memory range C0000–DFFFF, said second source corresponding to a second memory range E0000–EFFFF, said third source corresponding to a third memory range F0000–F7FFF, and said fourth source corresponding to a fourth memory range F8000–FFFFF, said first and second control inputs selecting said first data input when said selected address range of said input address is within said first memory range, said second data input when said selected address range of said input address is within said second memory range, said third data input when said selected address range of said input address is within said third memory range, and said fourth data input when said selected address range of said input address is within said fourth memory range or within HiROM FFFF0000–FFFFFFFF.

43. The apparatus according to claim 42, further comprising a first OR gate having a first input being 1 if said input address is within F8000–FFFFF, a second input being 1 if said input address is within FFFF0000–FFFFFFFF, a third input being 1 if said input address is within F0000–F7FFF, and an output, and a second OR gate having a first input being 1 if said input address is within F8000–FFFFF, a second input being 1 if said input address is within FFFF0000–FFFFFFFF, a third input being 1 if said input address is within E0000–EFFFF, and an output, said inputs to said first and second OR gates otherwise being 0, said first control input being coupled to said first OR gate output, and said second control input being coupled to said second OR gate output.

44. The apparatus according to claim 43, each of said selectable inverter elements comprising an exclusive OR gate.

45. The apparatus according to claim 42, said selected address range being C0000–DFFFF.

46. The apparatus according to claim 42, said selected address range being E0000–EFFFF.

47. The apparatus according to claim 42, said selected address range being F0000–F7FFF.

48. The apparatus according to claim 42, said selected address range comprising F8000–FFFFF.

49. The apparatus according to claim 42, said selected address range comprising FFFF0000–FFFFFFFF.

50. The apparatus according to claim 29, further comprising a translating means for preventing a device from being accessed by said outputs of said four selectable inverter elements by translating said outputs of said four selectable inverter elements to an address not corresponding to an address of said device.

51. In a computer system having an address bus including a plurality of address lines, apparatus for selectively inverting the state of one of the address lines, comprising:
inversion selecting means, wherein the address line to be inverted is selected according to an input address within a selected address range and a user selectable input bit having a predefined logic level; and
means for inverting the selected address line.

52. In a computer system having an address bus including a plurality of address lines, apparatus for selectively inverting the states of a plurality of address lines, comprising:
inversion selecting means, wherein the address lines to be inverted are selected according to an input address within a selected address range and a plurality of user selectable input bits having a predefined logic level, each of said user selectable input bits corresponding to a different one of the plurality of address lines; and
means for inverting the selected address lines.

53. In a computer system having an address bus including a plurality of address lines, a method for selectively inverting the state of an address line on a multibit address bus, comprising the steps of:
selecting the address line to be inverted according to an input address within a selected address range and a user selectable input bit having a predefined logic level; and
inverting the selected address line.

54. In a computer system having an address bus including a plurality of address lines, a method for selectively inverting the states of a plurality of address lines on a multibit address bus, comprising the steps of:
selecting the address lines to be inverted according to an input address within a selected address range and a plurality of user selectable input bits having a predefined logic level, each of said user selectable input bits corresponding to a different one of the plurality of address lines; and inverting the selected address lines.

* * * * *

UNITED STATES PATENT AND TRADEMARK OFFICE
CERTIFICATE OF CORRECTION

PATENT NO. : 5,987,581
DATED : November 16, 1999
INVENTOR(S) : William Harry Nale Page 1 of 2

It is certified that error appears in the above-identified patent and that said Letters Patent is hereby corrected as shown below:

On Column 3, line 56, please replace "space C0000-LM while" with --space C0000-1M while--.

On Column 4, line 39, please replace "address is C9OFE" with --address is C90FE--.

On Column 5, line 41, please replace "than an 10 cycle" with --than an IO cycle--.

On Column 8, line 16, please replace "the 4-to-1 multiplexer" with --The 4-to-1 multiplexer--.

On Column 9, line 22, please replace "to be selectably inverted" with --to be selectively inverted--.

UNITED STATES PATENT AND TRADEMARK OFFICE
CERTIFICATE OF CORRECTION

PATENT NO. : 5,987,581
DATED      : November 16, 1999
INVENTOR(S): William harry Nale

Page 2 of 2

It is certified that error appears in the above-indentified patent and that said Letters Patent is hereby corrected as shown below:

On column 9, line 31, please replace "ouputting " with --outputting--.

Signed and Sealed this

Twenty-seventh Day of March, 2001

Attest:

NICHOLAS P. GODICI

*Attesting Officer*    *Acting Director of the United States Patent and Trademark Office*